(12) United States Patent
Arai

(10) Patent No.: US 10,037,860 B2
(45) Date of Patent: Jul. 31, 2018

(54) ION FILTER AND METHOD OF MANUFACTURING SAME

(71) Applicant: FUJIKURA LTD., Tokyo (JP)

(72) Inventor: Daisuke Arai, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/512,518

(22) PCT Filed: Sep. 10, 2015

(86) PCT No.: PCT/JP2015/075705
§ 371 (c)(1),
(2) Date: Mar. 17, 2017

(87) PCT Pub. No.: WO2016/043115
PCT Pub. Date: Mar. 24, 2016

(65) Prior Publication Data
US 2017/0256378 A1  Sep. 7, 2017

(30) Foreign Application Priority Data

Sep. 17, 2014 (JP) ................................. 2014-189317

(51) Int. Cl.
*H01J 1/46* (2006.01)
*H01J 9/14* (2006.01)
*H01J 47/06* (2006.01)

(52) U.S. Cl.
CPC ...... *H01J 1/46* (2013.01); *H01J 9/14* (2013.01); *H01J 47/06* (2013.01)

(58) Field of Classification Search
USPC .............. 250/281, 282, 385.1, 526
See application file for complete search history.

(56) References Cited

U.S. PATENT DOCUMENTS 6,011,265 A * 1/2000 Sauli ................ H01J 47/02
                                              250/374
6,198,798 B1   3/2001 Sauli
(Continued)

FOREIGN PATENT DOCUMENTS

CN   102007566 A   4/2011
CN   103681204 A   3/2014
(Continued)

OTHER PUBLICATIONS

Journal of Instrumentation, Institute of Physics Publishing, Bristol, GB, vol. 8, No. 11, Nov. 25, 2013 (Nov. 25, 2013), KP020253168, ISSN: 1748-0221, DDL 10.1088/1748-0221/8/11/Oil023.*
(Continued)

*Primary Examiner* — Bernard Souw
(74) *Attorney, Agent, or Firm* — Osha Liang LLP

(57) ABSTRACT

An ion filter used for an electron multiplier includes an insulating substrate; a first conductive layer formed on one main surface of the substrate; and a second conductive layer formed on another main surface of the substrate. The ion filter has a plurality of through-holes formed along a thickness direction of the substrate. The one main surface of the substrate is disposed at a downstream side in a moving direction of electrons in a chamber of the electron multiplier and the other main surface of the substrate is disposed at an upstream side in the moving direction of electrons in the chamber of the electron multiplier. A first thickness of the first conductive layer formed on the one main surface of the substrate is thicker than a second thickness of the second conductive layer on the other main surface of the substrate.

7 Claims, 7 Drawing Sheets

(56) References Cited

U.S. PATENT DOCUMENTS

| | | | | |
|---|---|---|---|---|
| 2004/0258206 | A1* | 12/2004 | Maolinbay | H01J 47/02 378/98.8 |
| 2009/0084972 | A1 | 4/2009 | Tamagawa et al. | |
| 2011/0024616 | A1 | 2/2011 | Pringle | |
| 2011/0089042 | A1* | 4/2011 | De Oliveira | H01J 47/02 205/223 |

FOREIGN PATENT DOCUMENTS

| | | |
|---|---|---|
| EP | 2164092 A1 | 3/2010 |
| JP | 2001-508935 A | 7/2001 |
| JP | 2005-010163 A | 1/2005 |
| JP | 2007-234485 A | 9/2007 |
| JP | 4264984 B2 | 5/2009 |
| JP | 2010-067613 A | 3/2010 |
| JP | 2011-505656 A | 2/2011 |
| JP | 2012-185025 A | 9/2012 |
| JP | 5022611 B2 | 9/2012 |
| NL | 1035934 C | 3/2010 |

OTHER PUBLICATIONS

Office Action in corresponding Japanese Patent Application No. 2014-189317 dated Feb. 9, 2016 (4 pages).

Office Action in corresponding Japanese Patent Application No. 2014-189318 dated Feb. 9, 2016 (4 pages).

F. Sauli et al., "Ion feedback suppression in time projection chambers", Nuclear Instruments and Methods in Physics Research A 560(2006): 269-277 (9 pages).

Xie Wen-Qing et al., "Electron transmission efficiency of gating-GEM foil for TPC", Chinese Physics C, vol. 36, No. 4, Apr. 2012; p. 339-343 (5 pages).

P. Gros et al., "Blocking positive ion backflow using a GEM gate: experiment and simulations", 3rd International Conference on Micro Pattern Gaseous Detectors; Jul. 1-6, 2013; Journal of Instrumentation; Nov. 2013; Impact Factor: 1.4 DOI:10.1088/1748-0221/8/11/C11023 (11 pages).

European Search Report issued in corresponding European Patent Application 15841522.4 dated Apr. 3, 2018 (10 pages).

Katsumasa Ikematsu, Development of Large-Aperture GEMs as a Gating Device of the ILC-TPC for Blocking Positive Ion Feedback, 2014 IEEE Nuclear Science Symposium and Medical Imaging Conference (NSS/MIC), IEEE, Nov. 8, 2014 (Nov. 8, 2014), pp. 1-4, XP032880261 (4 pages).

A. Buzulutskov et al., "Electric and Photoelectric Gates for ion backflow suppression in multi-GEM structures", Journal of Instrumentation, Institute of Physics Publishing, Bristol, GB, vol. 1, No. 8, Aug. 1, 2006 (Aug. 1, 2006), pp. P08006-P08006, XP020111385 (16 pages).

Marco Villa et al., "Progress on large area GEMs", Nuclear Instruments and Methods in Physics Research. Section A: Accelerators, Spectrometers, Detectors, and Associated Equipment, vol. 628, No. 1, Jul. 4, 2010 (Jul. 4, 2010), pp. 182-186, XP028128045 (5 pages).

Office Action issued in corresponding Chinese Patent Application No. 201580049701.7 dated Apr. 27, 2018, with translation (14 pages).

* cited by examiner

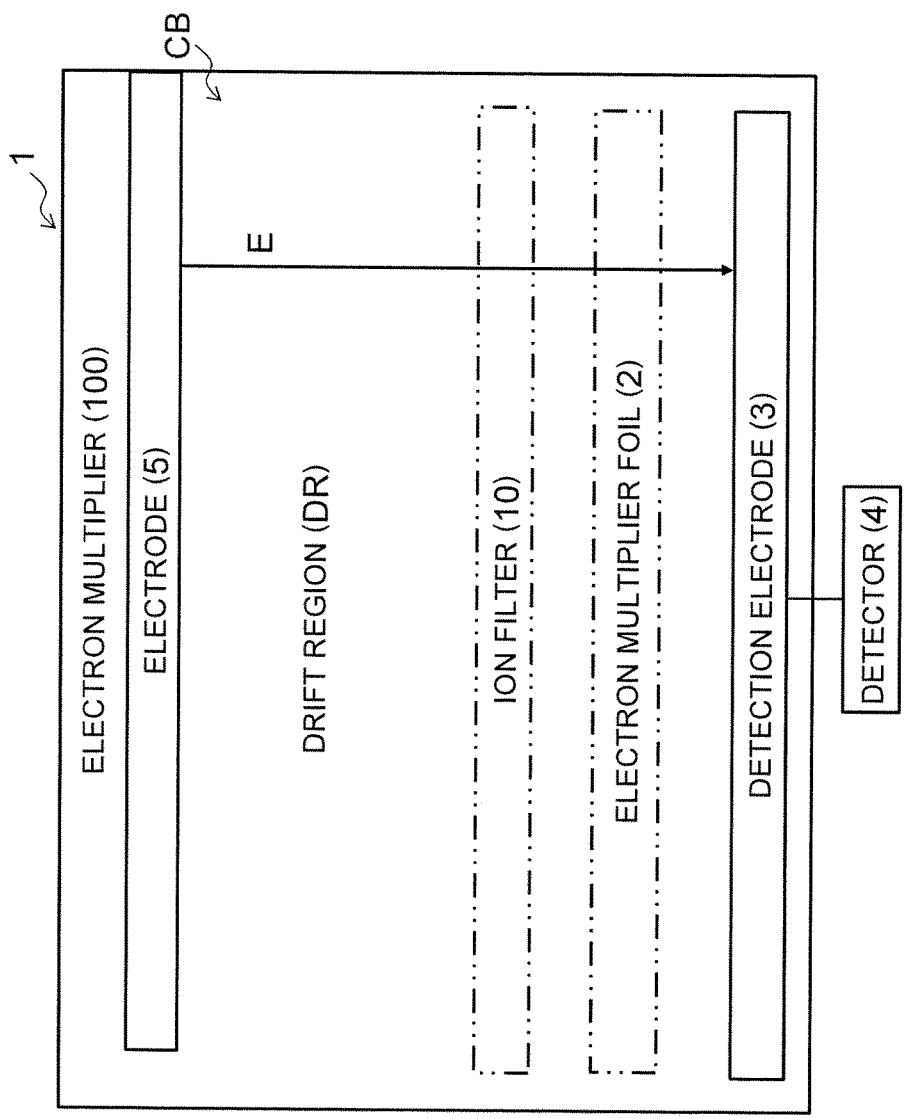

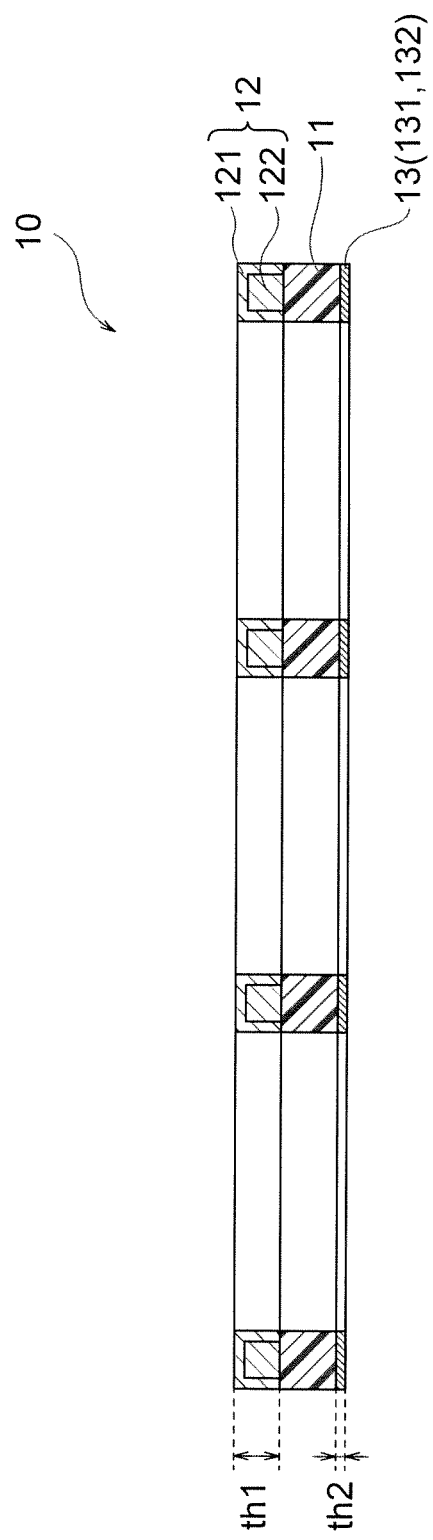

ION FILTER AND METHOD OF MANUFACTURING SAME

TECHNICAL FIELD

The present invention relates to an ion filter used for an electron multiplier and a method of manufacturing the same.

The contents of Patent Application No. 2014-189317, filed with Japan Patent Office on Sep. 17, 2014, are incorporated herein by reference in the designated countries in which the incorporation by reference is accepted.

BACKGROUND ART

A gas electron multiplier including an electron multiplier foil is known in the art (Patent Document 1).

PRIOR ART DOCUMENT

Patent Document

[Patent Document 1] JP2007-234485A

SUMMARY OF THE INVENTION

Problems to be Solved by Invention

Gas electron multipliers of this type used for a gas detector are configured to receive radiation to be detected, multiply electrons by avalanche effects using an electron multiplier foil having a large number of through-holes, and detect its electric signal. Electrons are released from gas atoms by the interaction due to the photoelectric effect of radiation and gas.

Multiplication of a number of electrons generates the same number of positive ions. Positive ions proceed in the opposite direction to the moving direction of electrons because the positive ions are affected by electric fields in the through-holes of the electron multiplier foil.

Since the moving speed of positive ions having a relatively large mass is slower than the moving speed of electrons, positive ions gather and remain inside a time projection chamber including the gas electron multiplier so as to form a shape depending on the shape of the electron multiplier foil (e.g. a flat plate-like shape), which may generate an electric field.

The electric field generated by the positive ions changes the moving direction of electrons to be measured and thus causes a so-called positive-ion problem that affects the detection accuracy of a gas detector, such as a time projection chamber (TPC).

To overcome this positive-ion problem, a conventional scheme of using wire electrodes is known in which the wire electrodes are arranged above the electron multiplier foils such that the electric fields generated by the wire electrodes prevent the positive ions from proceeding.

When the wire electrodes are used under a high magnetic field, however, another problem occurs in that the E×B effect takes place in the vicinity of the wire electrodes to distort the trajectories of moving electrons near the wire electrodes.

In addition, if the movement of electrons is also blocked when preventing the positive ions from proceeding, the detection accuracy will deteriorate, which may also be problematic.

Thus, the existing challenge is to contrive to prevent positive ions from proceeding while suppressing the effect of affecting the movement of electrons and the trajectories of moving electrons.

Problems to be solved by the present invention include providing an ion filter that prevents positive ions from proceeding while suppressing the effect of affecting the movement of electrons and the trajectories of moving electrons.

Means for Solving Problems (1) The present invention solves the above problems by providing an ion filter used for an electron multiplier, the ion filter comprising an insulating substrate; a first conductive layer formed on one main surface of the insulating substrate; and a second conductive layer formed on another main surface of the insulating substrate, the ion filter having a plurality of through-holes formed along a thickness direction of the insulating substrate, wherein a first thickness of the first conductive layer is different from a second thickness of the second conductive layer.

(2) In the above invention, the above problems are solved by disposing the one main surface of the insulating substrate at a downstream side in a moving direction of electrons in a chamber of the electron multiplier, disposing the other main surface of the insulating substrate at an upstream side in the moving direction of electrons in the chamber of the electron multiplier, and configuring the first thickness of the first conductive layer formed on the one main surface of the insulating substrate to be thicker than the second thickness of the second conductive layer.

(3) In the above invention, the above problems are solved by providing the ion filter side by side with an electron multiplier foil of the electron multiplier, disposing the one main surface of the insulating substrate at a side of the electron multiplier foil, and configuring the first thickness of the first conductive layer formed on the one main surface to be thicker than the second thickness of the second conductive layer formed on the other main surface.

(4) In the above invention, the above problems are solved by forming a surface part of the first conductive layer of a first material and forming a surface part of the second conductive layer of a second material different from the first material.

(5) In the above invention, the above problems are solved by making the first thickness be 30 times or less the second thickness.

(6) In the above invention, the above problems are solved by making an opening-area ratio (a hole-area ratio) by the through-holes be 75% or more.

(7) The present invention solves the above problems by providing a manufacturing method comprising: preparing a substrate comprising an insulating substrate, a conductive layer formed on one main surface of the insulating substrate, and a conductive layer formed on another main surface of the insulating substrate and having a thickness thinner than that of the conductive layer formed on the one main surface; forming a first conductive layer having a predetermined pattern by removing predetermined regions of the conductive layer formed on the one main surface; removing regions of the insulating substrate corresponding to the predetermined regions by irradiation of laser from a side of the one main surface; and removing regions of the conductive layer formed on the other main surface by etching using etchant (making an etching liquid act) on the conductive layer from both surface sides of the substrate from which the predetermined regions are removed, the regions of the conductive layer formed on the other main surface corresponding to the predetermined regions.

(8) The present invention solves the above problems by providing a manufacturing method comprising: preparing a substrate comprising an insulating substrate, a conductive layer formed on one main surface of the insulating substrate, and a conductive layer formed on another main surface of the insulating substrate and having a thickness thinner than that of the conductive layer formed on the one main surface; forming a first conductive layer having a predetermined pattern by removing predetermined regions of the conductive layer formed on the one main surface; removing regions of the insulating substrate corresponding to the predetermined regions by irradiation of laser from a side of the one main surface or by etching using etchant (using an etching liquid) from the side of the one main surface; covering with an etching resist a surface of the conductive layer formed on the other main surface of the insulating substrate; and removing regions of the conductive layer formed on the other main surface by etching using etchant (making an etching liquid act) on the conductive layer from the side of the one main surface of the substrate from which the predetermined regions are removed, the regions of the conductive layer formed on the other main surface corresponding to the predetermined regions.

Effect of Invention

According to the present invention, an ion filter can be provided which prevents positive ions from proceeding while suppressing the effect of affecting the movement of electrons and the trajectories of moving electrons.

BRIEF DESCRIPTION OF DRAWINGS

FIG. 1 is a schematic view of a gas detector including an electron multiplier according to an embodiment of the present invention.

FIG. 2D is a cross-sectional view schematically illustrating a second example of a cross section along line IIC-IIC illustrated in FIG. 2B.

MODE(S) FOR CARRYING OUT THE INVENTION

Figure 2A:
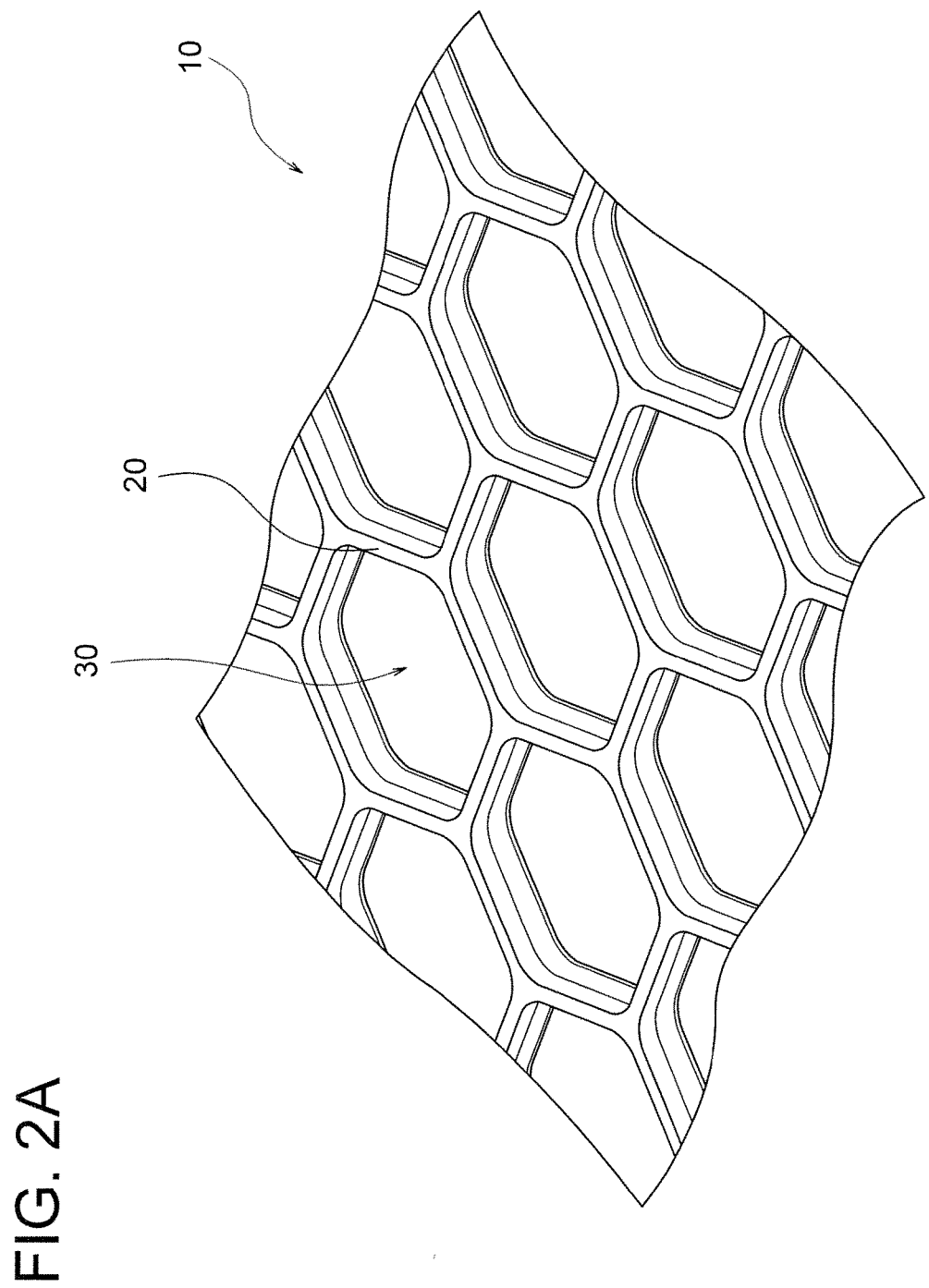
FIG. 2A is a perspective view schematically illustrating an example of the ion filter according to an embodiment of the present invention.

Hereinafter, one or more embodiments of the present invention will be described with reference to the drawings. In the present embodiment, an exemplary case will be described in which the ion filter according to the present invention is applied to a gas electron multiplier, which is one of electron multipliers used for a gas detector, such as a time projection chamber (TPC). In the present description, the gas electron multiplier having the electron multiplier foil may be referred to as an "electron multiplier." The electron multiplier 100 of the present embodiment is used to detect radiation, such as electrically-charged particles, gamma rays, X-rays, neutrons and ultraviolet rays. The gas detectors including electron multipliers of this type are configured to receive the radiation to be detected, multiply photoelectrons using avalanche effects, and detect the radiation as an electric signal. Photoelectrons are released from gas atoms by the interaction due to the photoelectric effect of radiation and gas.

FIG. 1 is a schematic view of the electron multiplier 100 used in the gas detector 1 in the present embodiment.

As illustrated in FIG. 1, the electron multiplier 100 used in the gas detector 1 of the present embodiment has an electrode 5 disposed in a chamber CB, an ion filter 10, an electron multiplier foil 2, and a detection electrode 3. An electric power supply, which is not illustrated, supplies electric power to the electrode 5, ion filter 10, electron multiplier foil 2, and detection electrode 3. The electron multiplier 100 of the present embodiment is used in a gas detector 1, such as a time projection chamber (TPC). The gas detector 1 includes a detector 4 that acquires a detection signal from the detection electrode 3 of the electron multiplier 100.

The chamber CB forms a space filled with gas for detection. A combination of a rare gas and a quencher gas is generally used as the gas for detection which fills the chamber CB. Examples of the rare gas include He, Ne, Ar, and Xe. Examples of the quencher gas include gas, such as $CO_2$, $CH_4$, $C_2H_6$, $CF_4$, and $C_4H_{10}$. The mixing ratio of the quencher gas mixed into the rare gas may preferably be, but is not limited to being, 5% to 30%.

The electrode 5 forms an electric field in the chamber CB. Ionized electrons drift in this electric field toward the detection electrode 3 which functions as an anode.

The electron multiplier foil 2 multiplies electrons.

The electron multiplier foil 2 used in the present embodiment is formed such that both main surfaces of a sheet-like insulating substrate are formed with conductive layers, such as copper layers, and has a large number of through-holes. The through-holes of the electron multiplier foil 2 elongate approximately in the perpendicular direction to the main surfaces of the insulating substrate. An electric potential difference of several hundred volts is applied between the conductive layers, which are formed on both main surfaces of the insulating substrate, thereby to form high electric fields inside the through-holes. Electrons entering the through-holes are immediately accelerated. The accelerated electrons ionize the surrounding gas molecules, so that electrons are multiplied in avalanche inside the through-holes (avalanche effect). As known in the art, the electron multiplier foil 2 may also be referred to as a gas electron multiplier (GEM).

The thickness of the electron multiplier foil 2 may be, but is not limited to being, about several hundred micrometers. Well-known examples of the diameter and pitch of the through-holes of the electron multiplier foil 2 are about 70 [μm] and 140 [μm], respectively. The distance between the through-holes of the electron multiplier foil 2 can be about several hundred micrometers. The opening-area ratio by the through-holes of the electron multiplier foil 2 may be about 23%. A polymer material, such as polyimide and liquid crystal polymer, for example, may be used as the material of the insulating substrate which constitutes the electron multiplier foil 2. Copper, aluminum, gold, or boron, for example, may be used as the material of the conductive layers which constitute the electron multiplier foil 2. The conductive layers of the electron multiplier foil 2 may be formed through vapor deposition of the conductive material on the insulating material by sputtering, may be formed using a plating process, or may be formed using a lamination process.

The detection electrode 3 detects electrons that are multiplied by the avalanche effect and sends the detection signal to the detector 4. The detector 4 calculates various detection data on the basis of the acquired signal. The detection data may be, but are not limited to being, used for measurement of trajectories of electrically-charged particles, measurement of the positions and energy of incident particles, and other purposes.

Electrons move along the moving direction E, denoted by the arrow, in the chamber CB. The electrode 5 is located at the upstream side in the moving direction of electrons and the detection electrode 3 is located at the downstream side.

The ion filter 10 of the present embodiment will then be described.

As previously described, the multiplication of a number of electrons by ionization of the gas generates the same number of positive ions. There are positive ions, among the generated positive ions, which come from middle areas of the through-holes of the electron multiplier foil 2 and pass through the electron multiplier foil 2 to move (feed hack) to a drift region DR. Since the drift speed of positive ions is slow, the fed-back positive ions remain as a group in the drift region for a long time so as to form a shape depending on the shape of the electron multiplier foil 2 (e.g. a flat plate-like shape corresponding to the shape of the electron multiplier foil 2) and also form a site in the drift region DR in which the ion density is locally high. This will distort the electric field in the drift region DR. When a magnetic field exists in the chamber, the drifting electrons may undergo the E×B effect to deteriorate the position resolution.

The ion filter 10 of the present embodiment has a function of collecting the generated positive ions due to the electron Multiplication so that the positive ions do not move toward the drift region DR (in the opposite direction to the moving direction E of electrons).

The ion filter 10 of the present embodiment has an insulating substrate, a first conductive layer formed on one main surface of the insulating substrate, a second conductive layer formed on the other main surface of the insulating substrate, and a plurality of through-holes formed along the thickness direction of the insulating substrate.

FIG. 2A, FIG. 2B, FIG. 2C and FIG. 2D are views schematically illustrating an example of the ion filter 10 according to the present embodiment.

Figure 2B:
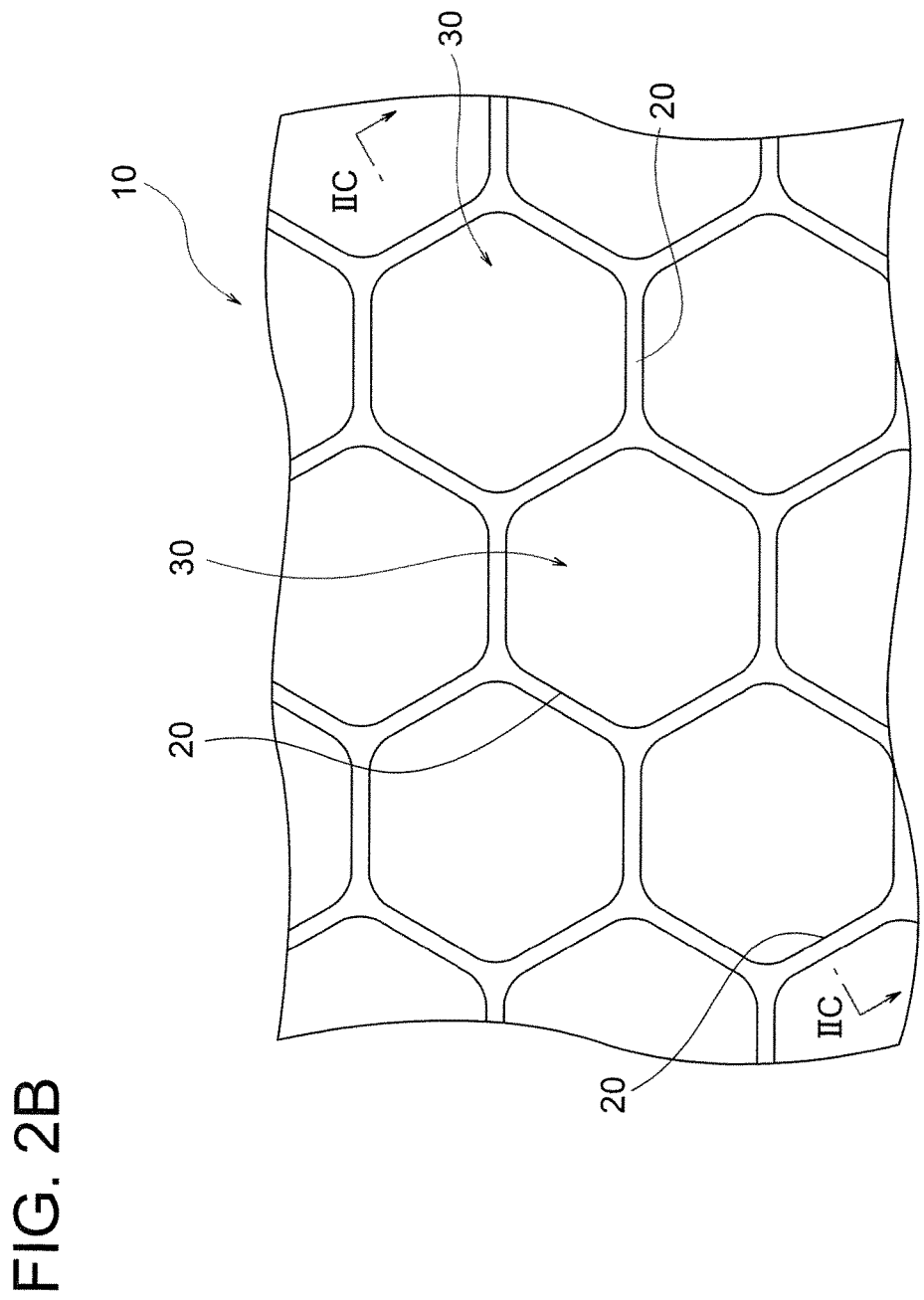
FIG. 2B is a plan view schematically illustrating an example of the ion filter according to an embodiment of the present invention.

FIG. 2A is a perspective view of the ion filter 10 according to the present embodiment and FIG. 2B is a plan view of the ion filter 10 according to the present embodiment. As illustrated in each figure, the ion filter 10 of the present embodiment has through-holes 30. A rim 20 is formed between adjacent through-holes 30. The through-holes 30 are surrounded by the rim 20. The rim 20 forms inner walls for the through-holes 30. The through-holes 30 form apertures 31 arranged along the main surfaces of the ion filter 10.

The opening-area ratio by the through-holes 30 in the ion filter 10 of the present embodiment may be, but is not limited to being, 75% or more. In the present embodiment, the opening-area ratio by the through-holes 30 refers to a ratio of the total area of the apertures 31 formed by the through-holes 30 to a predetermined unit area along the main surfaces of the insulating substrate. The unit area for calculating the opening-area ratio can be arbitrarily defined. The apertures 31 are two-dimensional regions which are along the main surfaces of the ion filter and within which the insulating substrate and the conductive layers are not present. The shape of the apertures 31 of the through-holes 30 according to the present embodiment is approximately a hexagonal shape. The ion filter 10 of the present embodiment has a so-called honeycomb structure.

The distance between parts of the rim 20 which surround each of the through-holes 30 may be 140 [µm] or more and 300 [µm] or less. The width of the rim 20 (distance between the nearest inner surfaces for the through-holes 30) may be 45 [µm] or less.

The ion filter 10 of the present embodiment functions to collect positive ions, which are being fed hack, so that they do not move toward the drift region DR, but is constrained not to impede the movement of electrons. For this reason, the ion filter 10 for use is required to have a structure in which the opening-area ratio by the through-holes 30 is high and the thickness is thin.

Simulation conducted by the present inventors has revealed that the opening-area ratio by the through-holes 30 of the ion filter 10 may preferably be 70% or more in order not to impede the movement of ions, that is, in order for the ion filter 10 to function as expected. The simulation conducted by the present inventors has also revealed that the thickness of an insulating substrate 11 of the ion filter 10 may preferably be 25 [µm] or less in order not to impede the movement of ions.

According to one or more embodiments of the present invention, the ion filter 10 is provided to satisfy such conditions.

The ion filter 10 of the present embodiment is disposed at the upstream side (the side of the electrode 5 and drift region DR) of the electron multiplier foil 2, which multiplies electrons, as a separate member from the electron multiplier foil 2. The ion filter 10 of the present embodiment is used for the purpose of collecting positive ions generated due to the electron multiplication, which is a different purpose than that of the electron multiplier foil 2, and has a different function than that of the electron multiplier foil 2.

In the present embodiment, the ion filter 10 is disposed at the upstream side (the side of the electrode 5 and drift region DR) than the electron multiplier foil 2 in the moving direction F of electrons. That is, the ion filter 10 is disposed between the electron multiplier foil 2 and the electrode 5. Such arrangement of the ion filter 10 allows the ion filter 10 to collect the positive ion group generated in the electron multiplier foil 2 and prevents the fed back positive ions from affecting the electric field of the drift region DR. Thus, the positive ion group is less likely to affect the drifting electrons.

Figure 2C:
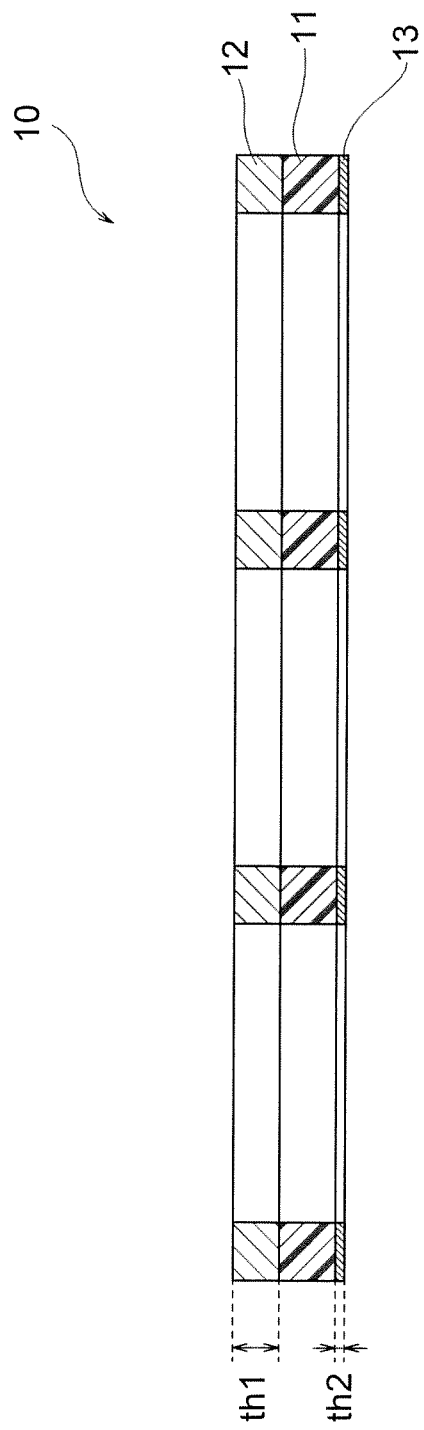
FIG. 2C is a cross-sectional view schematically illustrating a first example of a cross section along line IIC-IIC illustrated in FIG. 2B.

FIG. 2C is a view illustrating an example of a cross section of the ion filter 10 according to the present embodiment along line IIC-IIC illustrated in FIG. 2B.

As illustrated in FIG. 2C, the ion filter 10 of the present embodiment is configured such that a first thickness th1 of a first conductive layer 12 formed on one main surface of the insulating substrate 11 is different from a second thickness th2 of a second conductive layer 13 formed on the other main surface. This is because the electron transmission is enhanced when the first conductive layer 12 and the second conductive layer 13 have different thicknesses rather than when the first conductive layer 12 and the second conductive layer 13 have the same thickness. The enhanced electron transmission can improve the accuracy of measurement results obtained using the time projection chamber (TPC) as the gas detector 1 including the electron multiplier 100. For example, the position detection accuracy when measuring the trajectories of electrons can be improved.

In the ion filter 10 of the present embodiment, from a viewpoint, the first thickness th1 of the first conductive layer 12 may preferably be, but is not limited to being, 0.5 [μm] or more. The reason of this is as follows. When the first conductive layer 12 is formed on the insulating substrate 11, an adhesive layer is interposed between the first conductive layer 12 and the insulating substrate 11. The interfacial adhesion at the interfaces between the adhesive layer and the first conductive layer 12 and insulating substrate 11 should be ensured. In this context, if the thickness of the first conductive layer 12 is less than the above critical thickness, the adhesive layer (insulating layer) may be exposed to distort the electric field to be formed. On the other hand, the second thickness th2 of the second conductive layer 13 may preferably be 1.0 [μm] or more. This is because the expected effect cannot be obtained if the second conductive layer 13 is less than twice the first conductive layer 12.

In the ion filter 10 of the present embodiment, from another viewpoint, the first thickness fill may preferably be 30 times or less the second thickness th2. This is because electrons having transmitted through the ion filter 10 may return to the ion filter 10 if the ratio of the first thickness th1 of the first conductive layer 12 and the second thickness th2 of the second conductive layer 13 exceeds 30:1. The electrons having returned to the ion filter 10 results in poor electron transmission, so the first thickness th1 is set to 30 times or less the second thickness th2.

In the present embodiment, one main surface (first conductive layer 12 side) of the insulating substrate 11 is disposed at the downstream side (electron multiplier foil 2 side, detection electrode 3 side) in the moving direction E of electrons in the chamber CB of the electron multiplier 100 while the other main surface (second conductive layer 13 side) of the insulating substrate 11 is disposed at the upstream side (drift region DR side, electrode 5 side) in the moving direction E of electrons in the chamber CB of the electron multiplier 100. The first thickness th1 of the first conductive layer 12 formed on the one main surface of the insulating substrate 11 is adapted to be thicker than the second thickness th2 of the second conductive layer 13 formed on the other main surface. That is, the first thickness th1 of the first conductive layer 12 is thicker than the second thickness th2 of the second conductive layer 13.

When the electron multiplier 100 of the present embodiment includes the electron multiplier foil 2, the ion filter 10 is provided side by side with the electron multiplier foil 2 of the electron multiplier 100. One main surface of the insulating substrate 11 is disposed at the electron multiplier foil 2 side, and the first thickness th1 of the first conductive layer 12 formed on the one main surface is adapted to be thicker than the second thickness th2 of the second conductive layer 13 formed on the other main surface. As will be understood, the electron multiplier 100 may not include the electron multiplier foil 2, provided that the electron multiplier 100 has a function of multiplying electrons.

The present inventors simulated trajectories of electrons. Specifically, for the ion filter 10 having different thicknesses of the first conductive layer 12 and the second conductive layer 13 as in the present embodiment and for an ion filter having the same thickness of the first conductive layer 12 and the second conductive layer 13, trajectories of electrons when these ion filters were used in the time projection chamber (TPC) including the electron multiplier 100 were simulated. The electron transmission was obtained from the trajectories of electrons.

Studies on the results of simulation have revealed that the electron transmission is excellent in the ion filter 10 having different thicknesses of the first conductive layer 12 and the second conductive layer 1 according to the present embodiment rather than in the ion filter having the same thickness of the first conductive layer 12 and the second conductive layer 3.

In this simulation, the first conductive layer 12 and the second conductive layer 13 were assumed to be composed of copper.

Simulation results of trajectories of electrons were obtained for the ion filter 10 having the first conductive layer 12 thicker than the second conductive layer 13 and for the ion filter having the same thickness of the first conductive layer 12 and the second conductive layer 13. The ion filter 10 having the first conductive layer 12 thicker than the second conductive layer 13 was one of those having the ratio (second thickness th2:first thickness th1) of 1:10, 1:20, and 1:30. In this simulation, the thickness was assumed to be th1=1 [μm].

In this simulation, the first conductive layer 12 having a relatively thick thickness was disposed at the downstream side in the flow direction of electrons in the chamber CB and the second conductive layer 13 having a relatively thin thickness was disposed at the upstream side in the flow direction of electrons in the chamber CB.

Results of simulation have revealed that the region in which the first conductive layer 12 and the second conductive layer 13 block passing of electrons is narrow in the ion filter 10 having the first conductive layer 12 thicker than the second conductive layer 13, rather than in the ion filter having the same thickness of the first conductive layer 12 and the second conductive layer 13.

That is, the ion filter 10 in which the first conductive layer 12 is adapted to be thicker than the second conductive layer 13 may affect the trajectories of electrons rather than the ion filter having the same thickness of the first conductive layer 12 and the second conductive layer 13, but the force of recovering the positions of electrons having passed through the ion filter 10 to the original positions (to the positions before the electrons pass through the ion filter 10) is strong thereby to reduce the final deviating amount of the trajectories of electrons (xy directions: y represents the deviating amount along the flow direction of electrons).

This simulation has also revealed that, when the ratio of thicknesses of the first conductive layer 13 and the second conductive layer 13 exceeds 30 (first thickness th1:second thickness th2=30:1), a phenomenon occurs that electrons return toward the ion filter 10.

In the ion filter 10 of the present embodiment, the material which forms at least a surface part 121 of the first conductive layer 12 formed on one main surface of the insulating substrate 11, and the material which forms a surface part 131 of the second conductive layer 13 formed on the other main surface, may be different materials.

FIG. 2D illustrates an example in which the surface part 121 of the first conductive layer 12 is formed of a different material than that of the second conductive layer 13. As illustrated in FIG. 2I, the first conductive layer 12 has a structure that comprises a surface part 121 and a base part 122. The surface part 121 constitutes a part of the first conductive layer 12. The surface part 121 is an exposed part to external of the first conductive layer 12. The surface part 121 is formed on the surface of the base part 122. The surface part 121 is formed as a thin film or layer on the surface of the base part 122 using an appropriate scheme, such as plating and vapor deposition. The thickness of the surface part 121 is not particularly limited. The base part 122 included in the first conductive layer 12 is located between the surface part 121 and the insulating substrate 11. The base part 122 is a part other than the surface part 121 of the first conductive layer 12.

In the present embodiment, the second conductive layer 13 may have a structure that comprises a surface part 131 and a base part 132. The second conductive layer 13, the surface part 131 and the base part 132 can be configured in the same manner as that for the first conductive layer 12, the surface part 121 and the base part 122. Description of the first conductive layer 12, the surface part 121 and the base part 122 in the previous paragraph is borrowed herein for description of the second conductive layer 13, the surface part 131 and the base part 132.

In the example illustrated FIG. 2D, the first conductive layer 12 comprises the surface part 121 and the base part 122 while the second conductive layer 13 includes the surface part 131 and the base part 132 which are configured as one body. The surface part 131 and base part 132 of the second conductive layer 13 are configured as one body of the same material, and a part that provides the surface of the second conductive layer 13 constitutes the surface part 131.

In the ion filter 10 of the present embodiment, the surface part 121 of the first conductive layer 12 is formed of a material that contains one or more substances selected from the group consisting of copper, nickel, gold, tungsten, zinc, aluminum, chromium, tin, and cobalt. The surface part 131 of the second conductive layer 13 is also formed of a material that contains one or more substances selected from the group consisting of copper, nickel, gold, tungsten, zinc, aluminum, chromium, tin, and cobalt, but the material for the surface part 131 is different from the material for the surface part 121 of the first conductive layer 12.

Gold is suitable for the surface part 121 of the first conductive layer 12 and the surface part 131 of the second conductive layer 13 because of its stability.

Aluminum is suitable for the surface part 121 of the first conductive layer 12 and the surface part 131 of the second conductive layer 13 because of its light weight. Using aluminum can reduce the weight of the ion filter 10 and therefore of the electron multiplier 100.

Nickel is suitable for the surface part 121 of the first conductive layer 12 and the surface part 131 of the second conductive layer 13 because of its rigidity (strength). The rigidity contributes to the enhanced strength of the ion filter 10. Moreover, nickel is suitable for the surface part 121 of the first conductive layer 12 and the surface part 131 of the second conductive layer 13 because of its dimensional stability. The dimensional stability contributes to the flatness of the ion filter 10.

Tungsten is suitable for the surface part 121 of the first conductive layer 12 and the surface part 131 of the second conductive layer 13 because of its hardness. The hardness contributes to the enhanced tensile strength of the ion filter 10.

Aluminum, chromium, cobalt and nickel are suitable for the surface part 121 of the first conductive layer 12 and the surface part 131 of the second conductive layer 13 because the multiple Coulomb scattering is small. The multiple Coulomb scattering affects trajectories of electrons. If the trajectories of electrons are affected, the accuracy in a measurement process performed at the subsequent stage will also be affected. The effect of the multiple Coulomb scattering being small contributes to improvement in the measurement accuracy when using the detection results.

Gold, chromium, zinc, cobalt, nickel, tungsten and tin are suitable for the surface part 121 of the first conductive layer 12 and the surface part 131 of the second conductive layer 13 because they have reactivity in the gamma-ray region. The reactivity in the gamma-ray region improves the detection efficiency of gamma rays. This contributes to improvement in the detection accuracy of gas radiation detectors, such as a gamma camera and nondestructive tester.

Cobalt, nickel, chromium and tungsten are suitable for the surface part 121 of the first conductive layer 12 and the surface part 131 of the second conductive layer 13 because of high rigidity. The ion filter 10 having a thin structure formed with a large number of through-holes is likely to be affected by the deformation and/or wire breaking. High rigidity contributes to enhanced strength of the ion filter 10.

In the present embodiment, either the surface part 131 of the second conductive layer 13 or the surface part 121 of the first conductive layer 12 is formed of a material that contains copper. Copper is easy to work and thus suitable for production of a pattern of the thin rim 20 and high opening-area ratio as in the present embodiment, and is also easily available.

Although not particularly limited, in the ion filter 10 of the present embodiment, the surface part 121 of the first conductive layer 12 is formed of nickel and the base part 122 of the first conductive layer 12 is formed of copper, in this example, the surface part 121 of the first conductive layer 12 is formed through a plating process using nickel for the surface of the base part 122 formed of copper, Both the surface part 131 and the base part 132 of the second conductive layer 13 are formed of a material that contains copper. The surface part 131 and base part 132 of the second conductive layer 13 are configured as one body.

Although not particularly limited, the thickness of the base part 122, which is formed of copper, of the first conductive layer 12 is 8 [μm] and the thickness of the surface part 121 formed as a nickel plating layer is 2 [μm]. The thickness of the second conductive layer 13 formed of copper, of which the surface part 131 and the base part 132 are formed as one body, is 2 [μm].

Next, three forms of a method of manufacturing the ion filter 10 of the present embodiment will be described with reference to FIG. 3 and FIG. 4. FIG. 3 and FIG. 4 are illustrated as end elevational views for easy understanding of the manufacturing steps.

<First Manufacturing Method>

A first manufacturing method will first be described.

Figure 3A:
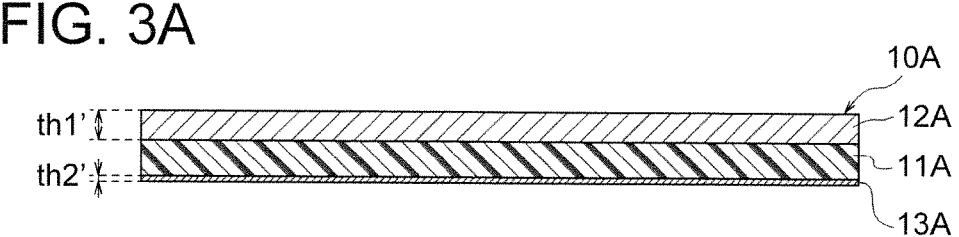
FIGS. 3A to 3D are views for describing a first method of manufacturing an ion filter of the present embodiment.

In the first manufacturing method, as illustrated in FIG. 3A, a substrate 10A is prepared in which a conductive layer 12A is formed on one main surface (upper surface in the figure) of an insulating substrate 11A and a conductive layer 13A is formed on the other main surface (lower surface in the figure). The thickness th1 of the conductive layer 12A is thicker than the thickness th2' of the conductive layer 13A. Although not particularly limited, the insulating substrate 11A of the substrate 10A used in the present embodiment has a thickness of 12 [μm] or more and 25 [μm] or less. Although not particularly limited, in the substrate 10A used in the present embodiment, the thickness th1' of the conductive layer 12A is 13 [μm] or more and the thickness th2' of the conductive layer 13A is less than 6 [μm].

As will be understood, the insulating substrate 11A illustrated in FIG. 1A corresponds to the insulating substrate 11 of the ion filter 10, the conductive layer 12A corresponds to the first conductive layer 12 of the ion filter 10, and the conductive layer 13A corresponds to the second conductive layer 13 of the ion filter 10.

Figure 3B:
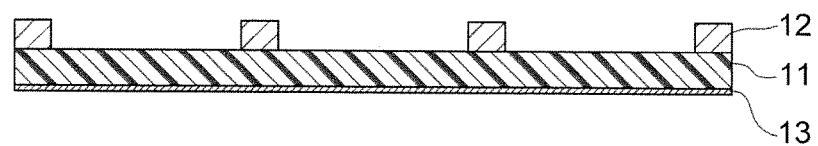

As illustrated in FIG. 3B, predetermined regions of the conductive layer 12A are removed using a known photolithographic technique to form the first conductive layer 12 having a predetermined pattern. In the present embodiment, the predetermined pattern is a honeycomb pattern. In the present embodiment, the first conductive layer 12 may preferably be formed to have a line width of 15 [μm] or more and 45 [μm] or less.

Figure 3C:
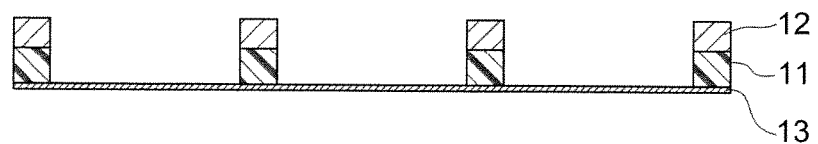

Then, as illustrated in FIG. 3C, parts of the insulating substrate 11 corresponding to the predetermined regions are removed.

Irradiation with UV-YAG laser of a wavelength of 500 [nm] or less is performed from the one main surface side (upper side in the figure) formed with the first conductive layer 12. For example, UV-YAG laser of third harmonic (wavelength of 355 [nm]) is used. The first conductive layer 12 formed to have the predetermined honeycomb pattern serves as a mask to the laser irradiation from the one main surface side, so that the regions of the insulating substrate 11 (hexagonal regions in this example) corresponding to the predetermined regions are removed. The insulating substrate 11 is partially removed up to the other main surface side from the one main surface side to form the through-holes 30.

This step of partially removing the insulating substrate 11 may also be performed using an etching liquid (etchant). When the etching liquid (etchant) acts on the substrate 10A in the state illustrated in FIG. 3B, the first conductive layer 12 and the second conductive layer 13 serve as masks to remove the regions of the insulating substrate 11 (hexagonal regions in this example) corresponding to the predetermined regions.

In an actual step of partially removing the insulating substrate 11 formed of polyimide or the like, tapers can be formed at boundary surfaces with the removed parts depending on the content of the step. For example, tapered surfaces having an angle of 50 to 60 degrees with respect to the main surfaces can be formed at the parts removed using the etching liquid (etchant). Such variation of forms is omitted in FIG. 3 for simplified description of steps.

A desmear process such as plasma desmear process is carried out. Various schemes known in the art at the time of filing of the present application may be appropriately used for the desmear process depending on the scheme of partially removing the insulating substrate 11.

Finally, in the state in which the regions of the insulating substrate 11 corresponding to the predetermined regions are removed, an etching liquid (etchant) is made to act on the substrate 10A from its both surface sides. The etching liquid (etchant) acts on the substrate 10A from the one main surface side of the conductive layer 13A formed at the other main surface side of the substrate 10A and also from the other main surface side of the conductive layer 13A. Regions from which the insulating substrate 11 is removed are etched from both sides. Accordingly, the etching speed for the parts of the conductive layer 13A corresponding to the predetermined regions is about twice the etching speed for a part of the conductive layer 13A corresponding to a region other than the predetermined regions. At the time when the regions of the conductive layer 13A corresponding to the predetermined regions are completely removed, the region of the conductive layer 13A corresponding to the region other than the predetermined regions remains. That is, only the regions of the conductive layer 13A corresponding to the predetermined regions are removed by the etching process to form the second conductive layer 13.

The etching liquid (etchant) can be appropriately selected depending on the material of the conductive layer 13A. In this process, the etching liquid (etchant) acts on the regions (regions to be removed) of the conductive layer 13A corresponding to the predetermined regions from both surface sides (from the one main surface side and the other main surface side). The regions of the conductive layer 13A corresponding to the predetermined regions are removed at a speed twice that for the remaining region. This etching process does not damage any circuit (conductive layer within a predetermined region) because the first conductive layer 12 is configured to be thicker than the second conductive layer 13.

Figure 3D:

As a result, as illustrated in FIG. 3D, through-holes can be formed to pass through from the one main surface side to the other main surface side. The ion filter 10 can thus be obtained which constitutes the predetermined pattern (e.g. honeycomb pattern).

As one example, when the substrate 10A including the conductive layer 12A having a thickness th1 of 13 [μm] and the conductive layer 13A having a thickness th2' of 6 [μm] was used to produce the ion filter 10 of the present embodiment, the ion filter 10 was able to be obtained with the first conductive layer 12 having a thickness th1 of 10 [μm] and the second conductive layer 13 having a thickness th2 of 2 [μm].

It is not easy to form the rim 20 from a thin sheet because the rim 20 is formed with the through-holes 30 having an opening-area ratio by 75% or more. In the photolithographic technique at the time of filing of the present application, the exposure accuracy is said to be about ±10 [μm]. Poor exposure accuracy causes misalignment of etching patterns. It is also difficult to accurately perform an etching process for the insulating substrate 11. For example, inclination may occur in the etching process for polyimide. It is thus difficult to form the same patterns on both main surfaces of an insulating substrate at aligned locations and form through-holes to correspond to the patterns. In addition, to achieve an opening-area ratio by 75% or more, the width of the rim 20 may have to be 45 [μm] or less and therefore such a conductive layer is not easy to form.

In a known photolithographic technique, the etching process is performed only from one main surface side of the substrate 10A. In contrast, according to the manufacturing method of the present embodiment, the etching process is performed concurrently from both main surfaces of the substrate 10A thereby to remove only certain regions of the conductive layer 13A at the other main surface side to form the through-holes 30. The problem of misalignment of the etching pattern due to the exposure accuracy limit does not occur because the known photolithographic technique is not used. Thus, the ion filter 10 formed with the through-holes 30 according to the present embodiment can be manufactured. According to this manufacturing method, the opening-area ratio by the through-holes 30 can be 75% or more. Moreover, etching the conductive layer 13A at the other main surface side does not require any step of forming a resist for pattern formation.

According to the studies by the present inventors, a phenomenon has been confirmed that some recovery takes place after electrons pass through the ion filter 10 of the present embodiment. That is, positions of electrons after passing through the ion filter 10 recover to positions of electrons before passing through the ion filter 10 (deviating amount decreases). The ion filter 10 of the present embodiment may affect the trajectories of electrons, but the force of recovering the positions of electrons having passed through the ion filter 10 to the original positions (to the positions before the electrons pass through the ion filter 10) is strong thereby to reduce the final deviating amount of the trajectories of electrons (xy directions: y represents the deviating amount along the flow direction of electrons). Thus, according to the present embodiment, the ion filter 10 can be provided which has a structure that can suppress movement of positive ions while suppressing the deviating amount of final positions of electrons. The production cost can also be reduced.

In this manufacturing method, a substrate 10A composed of materials in which the material for forming the conductive layer 12A is different from the material for forming the first conductive layer 12b may be prepared as the starting material of FIG. 3A. In this case, in the step of forming the first conductive layer 12 as illustrated in FIG. 3C, the predetermined regions of the first conductive layer 12 are removed using an etching liquid (etchant) that reacts with the conductive layer 12A but does not react with the conductive layer 13A. When the substrate 10A is composed of materials in which the material for forming the conductive layer 12A is different from the material for forming the first conductive layer 12b, then, the difference between the thickness th1' of the conductive layer 12A of the substrate 10A, used as the starting material and the thickness th1' of the obtained first conductive layer 12, and the difference between the thickness th2' of the conductive layer 13A of the substrate 10A used as the starting material and the thickness th2 of the obtained second conductive layer 13, can be small. That is, reduction in thicknesses can be small.

<Second Manufacturing Method>

A second manufacturing method will then be described with reference to FIG. 4. Basic steps of the second manufacturing method are in common with those of the previously-described first manufacturing method, so the illustration of FIG. 3 and description of the first manufacturing method will be borrowed herein for the second manufacturing method.

Figure 4A:
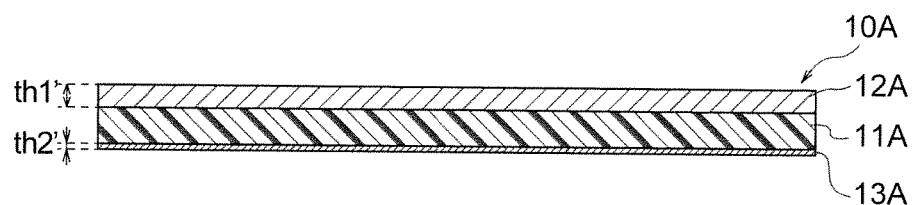
FIGS. 4A to 4E are views for describing a second method of manufacturing an ion filter of the present embodiment.

As in the first manufacturing method, as illustrated in FIG. 4A, a substrate 10A is prepared in which a conductive layer 12A is formed on one main surface (upper surface in the figure) of an insulating substrate 11A and a conductive layer 13A is formed on the other main surface (lower surface in the figure). A first material for thrilling the conductive layer 12A and a second material for forming the conductive layer 13A are the same materials. Both the first material and the second material are conductive materials. In this example, the first and second materials are copper. The conductive layer 12A and the conductive layer 13A can be made using a thin film forming method, such as plating, sputtering and vapor deposition.

As will be understood, the insulating substrate 11A illustrated in FIG. 4A corresponds to the insulating substrate 11 of the ion filter 10, the conductive layer 12A corresponds to the first conductive layer 12 of the ion filter 10, and the conductive layer 13A corresponds to the second conductive layer 13 of the ion filter 10.

Figure 4B:
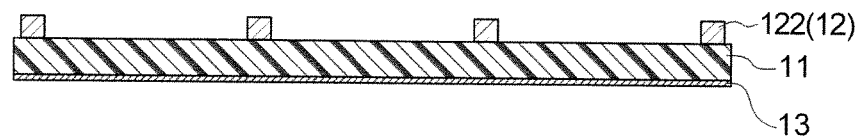

As illustrated in FIG. 4B predetermined regions of the conductive layer 12A are removed using a known photolithographic technique to form a base part 122 of the first conductive layer 12 having a predetermined pattern. This predetermined pattern formed by the base part 122 of the first conductive layer 12 is a honeycomb pattern in the plan view. Although not particularly limited, in this example, each of the conductive layer 12A and conductive layer 13A on the insulating substrate 11A is formed of a material that contains copper, and the predetermined regions of the conductive layer 12A are removed to form the base part 122 of the first conductive layer 12. In the present embodiment, the base part 122 of the first conductive layer 12 may preferably be formed to have a line width of 12 [μm] or more and 25 [μm] or less.

Figure 4C:
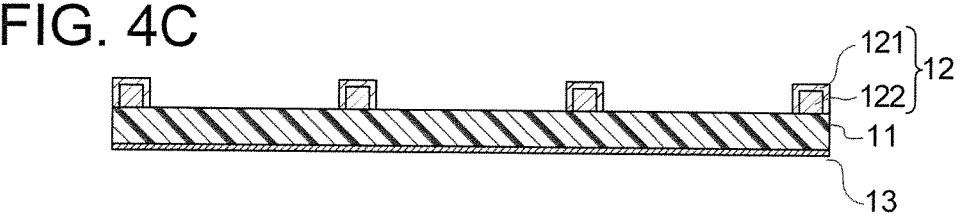

Then, as illustrated in FIG. 4C, a process is performed to form a surface part 121 on the base part 122 of the first conductive layer 12 which is formed on one main surface of the insulating substrate 11. The surface part 21 can be formed by plating, sputtering, vapor deposition, or other appropriate method. In the present embodiment, the surface part 121 of the first conductive layer 12 is formed using a different material than the material for forming a surface part 131 of the conductive layer 13A which is formed on the other main surface of the insulating substrate 11. Although not particularly limited, in the present embodiment, a nickel plating process is performed for the surface of the base part 122 of the first conductive layer 12. Through this process, the surface part 121 of a material containing nickel is formed on the surface of the first conductive layer 12. The line width of the first conductive layer 12, in which the surface part 121 is formed on the base part 122, corresponds to the width of the rim 20. The width of the rim 20 is 15 [μm] or more and 45 [μm] or less.

Then, parts of the insulating substrate 11 corresponding to the predetermined regions are removed.

Figure 4D:
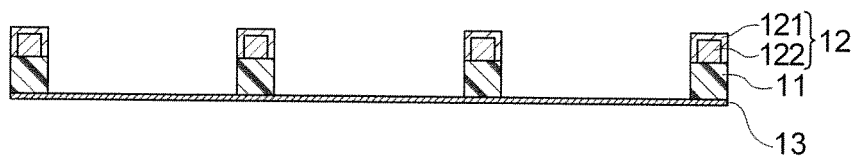

As in the first manufacturing method, as illustrated in FIG. 4D, irradiation with UV-YAG laser of a wavelength of 500 [nm] or less is performed from the one main surface side (upper side in the figure) formed with the first conductive layer 12 so that the insulating substrate 11 is partially removed up to the other main surface side from the one main surface side to form through-holes. As in the first manufacturing method, this step of partially removing the insulating substrate 11 may also be performed using an etching liquid (etchant). Thereafter, a desmear process such as plasma desmear process is carried out as in the first manufacturing method.

Finally, in the state in which the regions of the insulating substrate 11 corresponding to the predetermined regions are removed but the second conductive layer 13 remains on the other surface of the insulating substrate 11, an etching liquid (etchant) is made to act on the substrate 10A from its both surface sides to remove regions of the second conductive layer 13 corresponding to the predetermined regions. That is, regions of the second conductive layer 13 corresponding to the through-holes 30 are removed.

The etching liquid (etchant) can be appropriately selected depending on the material of the conductive layer 13A. In this step, an etching liquid (etchant) is used which reacts only with the material forming the conductive layer 133 to be partially removed. In this example, the conductive layer 13A is formed of a material that contains copper, so an etching liquid (etchant) reacting only with copper is used. This etching liquid (etchant) may be a mixture of sulfuric acid and hydrogen peroxide water. On the other hand, the surface part 121 of the first conductive layer 12 is formed of a material that contains nickel. This etching process therefore does not damage any circuit (conductive layer within a predetermined region).

In this process, the etching liquid (etchant) acts on the regions (regions to be removed) of the conductive layer 13A corresponding to the predetermined regions from both surface sides (from the one main surface side and the other main surface side). The regions of the conductive layer 13A corresponding to the predetermined regions are removed at a speed twice that for the remaining region. At the time when the regions of the conductive layer 13A corresponding to the predetermined regions are completely removed, a region of the conductive layer 13A corresponding to a region other than the predetermined regions remains. That is, only the regions of the conductive layer 13A corresponding to the predetermined regions can be removed by the etching process to form the second conductive layer 13.

Figure 4E:
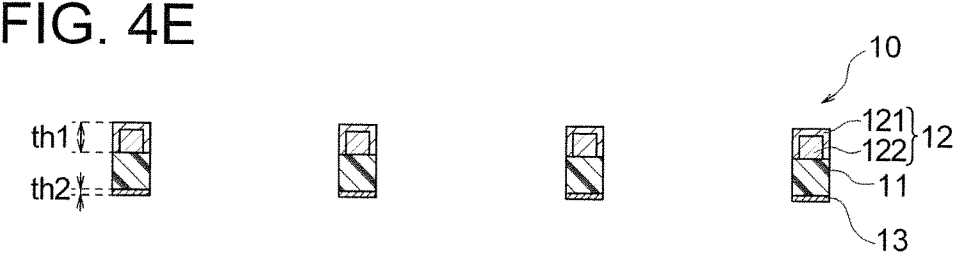

As a result, as illustrated in FIG. 4E, through-holes can be formed to pass through from the one main surface side to the other main surface side. The ion filter 10 can thus be obtained which constitutes the predetermined pattern (e.g. honeycomb pattern).

<Third Manufacturing Method>

A third manufacturing method will further be described. Basic steps of the third manufacturing method are in common with those of the first manufacturing method and the second manufacturing method. In the third manufacturing method, the insulating substrate 11A in the first and second manufacturing methods is removed by laser and the step below for forming an etching resist is performed as a subsequent step after a desmear process is performed.

After the desmear process is performed, an etching resist is attached to the whole surface of the conductive layer 13A which is formed at the other main surface side of the insulating substrate 11A. The etching resist covers the whole of the exposed surface of the conductive layer 13A at the other main surface side. An etching process is performed in the state in which the etching resist is attached. Regions of the conductive layer 13A corresponding to the predetermined regions are removed by the etching process. Thereafter the etching resist is removed.

According to this manufacturing method in which the etching resist is formed, as compared with the first manufacturing method without forming an etching resist, the difference between the thickness th1' of the conductive layer 12A of the substrate 10A used as the starting material and the thickness th1 of the obtained first conductive layer 12, and the difference between the thickness th2' of the conductive layer 13A of the substrate 10A used as the starting material and the thickness th2 of the obtained second conductive layer 13, can be small.

As one example, according to this manufacturing method, when the substrate 10A including the conductive layer 12A having a thickness th1' of 13 [μm] and the conductive layer 13A having a thickness th2' of 2 [μm] was used to produce the ion filter 10 of the present embodiment, the ion filter 10 was able to be obtained with the first conductive layer 12 having a thickness th1 of 12 [μm] and the second conductive layer 13 having a thickness th2 of 2 [μm].

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

1 Gas detector
100 Electron multiplier
10 Ion filter
 11 Insulating substrate
 12 First conductive layer
  121 Surface part of first conductive layer
  122 Base part of first conductive layer
 13 Second conductive layer
  131 Surface part of second conductive layer
  132 Base part of second conductive layer
20 Rim
30 Through-hole
 31 Aperture
2 Electron multiplier foil
3 Detection electrode
4 Detector
5 Electrode
DR Drift region
E Moving direction of electrons

The invention claimed is:

1. An ion filter used for an electron multiplier, the ion filter comprising:
    an insulating substrate;
    a first conductive layer formed on one main surface of the insulating substrate; and
    a second conductive layer formed on another main surface of the insulating substrate,
    the ion filter having a plurality of through-holes formed along a thickness direction of the insulating substrate,
    wherein the one main surface of the insulating substrate is disposed at a downstream side in a moving direction of electrons in a chamber of the electron multiplier and the other main surface of the insulating substrate is disposed at an upstream side in the moving direction of electrons in the chamber of the electron multiplier,
    wherein a first thickness of the first conductive layer formed on the one main surface of the insulating substrate is thicker than a second thickness of the second conductive layer on the other main surface of the insulating substrate.

2. The ion filter according to claim 1,
    wherein the ion filter is provided side by side with an electron multiplier foil of the electron multiplier,
    wherein the one main surface of the insulating substrate is disposed at a side of the electron multiplier foil and the first thickness of the first conductive layer formed on the one main surface is thicker than the second thickness of the second conductive layer formed on the other main surface.

3. The ion filter according to claim 1, wherein a surface part of the first conductive layer is formed of a first material and a surface part of the second conductive layer is formed of a second material different from the first material.

4. The ion filter according to claim 1, wherein the first thickness of the first conductive layer is 30 times or less the second thickness of the second conductive layer.

5. The ion filter according to claim 1, wherein an opening-area ratio by the through-holes is 75% or more.

6. A method of manufacturing an ion filter, the method comprising:
    preparing a substrate comprising an insulating substrate, a conductive layer formed on one main surface of the insulating substrate, and a conductive layer formed on another main surface of the insulating substrate and having a thickness thinner than that of the conductive layer formed on the one main surface;
    forming a first conductive layer having a predetermined pattern by removing predetermined regions of the conductive layer formed on the one main surface;
    removing regions of the insulating substrate corresponding to the predetermined regions by irradiation of laser from a side of the one main surface or by etching using etchant from the side of the one main surface; and
    removing regions of the conductive layer formed on the other main surface by etching using etchant on the conductive layer from both surface sides of the substrate from which the predetermined regions are removed, the regions of the conductive layer formed on the other main surface corresponding to the predetermined regions.

7. A method of manufacturing an ion filter, the method comprising:
- preparing a substrate comprising an insulating substrate, a conductive layer formed on one main surface of the insulating substrate, and a conductive layer formed on another main surface of the insulating substrate and having a thickness thinner than that of the conductive layer formed on the one main surface;
- forming a first conductive layer having a predetermined pattern by removing predetermined regions of the conductive layer formed on the one main surface;
- removing regions of the insulating substrate corresponding to the predetermined regions by irradiation of laser from a side of the one main surface or by etching using etchant from the side of the one main surface;
- covering with an etching resist a surface of the conductive layer formed on the other main surface of the insulating substrate; and
- removing regions of the conductive layer formed on the other main surface by etching using etchant on the conductive layer from the side of the one main surface of the substrate from which the predetermined regions are removed, the regions of the conductive layer formed on the other main surface corresponding to the predetermined regions.

* * * * *